United States Patent [19]
Trafton et al.

[11] Patent Number: 5,982,477
[45] Date of Patent: Nov. 9, 1999

[54] FILM DRIVE APPARATUS FOR A PHOTOGRAPHIC FILM SCANNER

[75] Inventors: R. Winfield Trafton, Holley; Eric P. Hochreiter; Bonnie J. Patterson, both of Rochester; Duane J. Farling, Webster, all of N.Y.

[73] Assignee: Eastman Kodak Company, Rochester, N.Y.

[21] Appl. No.: 09/085,730

[22] Filed: May 27, 1998

[51] Int. Cl.⁶ .......................... H04N 5/253; G03G 27/62; B65H 20/02
[52] U.S. Cl. .................. 355/75; 358/487; 358/496; 358/498
[58] Field of Search .................. 355/18, 75, 76; 358/474, 487, 494, 496, 498, 493, 506; 348/96; 396/387, 411, 418; 352/166, 180

[56] References Cited

U.S. PATENT DOCUMENTS

| | | |
|---|---|---|
| 3,618,934 | 11/1971 | Germuska . |
| 3,888,579 | 6/1975 | Rodek et al. . |
| 3,929,327 | 12/1975 | Olson . |
| 4,607,836 | 8/1986 | Miyasaka . |
| 4,640,409 | 2/1987 | Holtman . |
| 5,226,643 | 7/1993 | Kriegel et al. . |
| 5,261,754 | 11/1993 | Sugiura . |
| 5,279,454 | 1/1994 | Morse et al. . |
| 5,324,022 | 6/1994 | Quackenbush et al. . |
| 5,400,117 | 3/1995 | Fetterman et al. .................. 355/75 |
| 5,461,492 | 10/1995 | Jones .......................... 358/487 |
| 5,550,650 | 8/1996 | Pan ........................... 358/487 |
| 5,594,527 | 1/1997 | Oku et al. ..................... 355/75 |
| 5,602,571 | 2/1997 | Suda et al. . |
| 5,660,489 | 8/1997 | Ishii et al. . |
| 5,683,078 | 11/1997 | Schieck . |
| 5,838,364 | 11/1998 | Ishibe et al. .................... 348/96 |

FOREIGN PATENT DOCUMENTS

| | | |
|---|---|---|
| 61-197339 | 9/1986 | Japan . |
| 61-277554 | 12/1986 | Japan . |
| 63-258339 | 10/1988 | Japan . |
| 5-739 | 1/1993 | Japan . |

*Primary Examiner*—Alan A. Mathews
*Attorney, Agent, or Firm*—Francis H. Boos, Jr.

[57] ABSTRACT

Film scanning apparatus having a film cartridge chamber for receiving a film cartridge containing photographic film having images to be scanned, a film takeup chamber and a film scan gate therebetween. The apparatus has an upstream nip roller set positioned between the film cartridge chamber and the film scan gate and includes at least one drive roller and pinch roller set in which the drive roller has a compliant film engagement surface. A downstream nip roller set is positioned between the film scan gate and the film takeup chamber and includes at least one drive roller and pinch roller set in which the drive roller has a compliant film engagement surface. The upstream nip roller set exerts constant tensioning force on film in the film scan gate buffering the film in the film scan gate against variable tensioning effects on the film caused by the film cartridge. A drive motor is directly connected to the downstream drive roller set and the downstream roller set is drivingly connected to the upstream drive roller set by an elastic drive belt. A differential compression force is exerted on the pinch rollers such that the force on the downstream pinch rollers is greater than on the upstream pinch rollers thereby causing a film speed differential between the upstream and downstream roller sets that maintains a desired degree of tension on film transported through the film scan gate.

8 Claims, 7 Drawing Sheets

5,982,477

FILM DRIVE APPARATUS FOR A PHOTOGRAPHIC FILM SCANNER

CROSS REFERENCE TO RELATED APPLICATIONS

Cross reference is made to the following commonly assigned, copending U.S. Applications filed concurrently herewith: Ser. No. 09/083,359, entitled "ULTRAVIOLET CURABLE RIVETING OF PRECISION ALIGNED COMPONENTS", Ser. No. 09/084,062, entitled "ILLUMINANT HEAD ASSEMBLY FOR FILM IMAGE SCANNER"; Ser. No. 09/083,604 entitled "IMAGING APPARATUS FOR A PHOTOGRAPHIC FILM IMAGE SCANNER" and Ser. No. 9/162,902 entitled "BI-DIRECTIONAL DUAL SPEED DRIVE".

FIELD OF THE INVENTION

The present invention relates generally to the field of photographic media image scanners. More specifically, the invention relates to small, low cost scanners adapted for use with personal computers by consumers who wish to generate digital images from processed film stored in a film cartridge as in the case of the Advanced Photo System (APS) film.

BACKGROUND OF THE INVENTION

A film scanner that passes film across a linear scanning gate must maintain the film absolutely in a flat plane along the length of the scanning aperture and must also advance the film through the scanning zone at a constant scan pitch in order to achieve proper scanning of the image on the film. It is known to provide an arced film scanning surface so that the scan direction of the film lies in a flat plane as the film passes over the scanning aperture. This procedure requires that the film be held in slight tension as it passes over the scanning aperture. Additionally, the rate of advance of the film across the scan gate must be held constant in order that the resultant lines of image scan be uniformly spaced in the direction of film motion across the scanning aperture. This tensioning and uniform rate of film drive can be achieved without great difficulty using a stepper motor to drive a single nip roller set downstream to pull the film from the film supply reel. In a scanner designed to pull film from an Advanced Photo System film storage cartridge, it has been found that the normal retention force of the film spool is somewhat irregular which adversely affects the uniformity of the film feed rate across the scanning aperture. For this reason, it is desirable to utilize a mechanism, such as an upstream nip roller set, to isolate the film drive from the irregular retention forces of the film cartridge. The introduction of an upstream nip roller set, however, introduces additional problems in holding the film feed rate constant across the scanning aperture.

U.S. Pat. No. 5,261,754 discloses a paper feeding device for a printer that utilizes a timing belt, i.e. impliedly an inelastic belt, to drive upstream and downstream nip roller sets at the same angular velocity and avoids irregular paper feed across a linear print head by tensioning the paper between the upstream and downstream roller sets. The tensioning is accomplished according to the explanation in the patent by employing metal, i.e. non-compliant, drive rollers and compliant pinch rollers and by applying a higher degree of pressure on the downstream pinch rollers than on the upstream pinch rollers. According to the explanation, the higher pressure on the downstream pinch rollers deforms the pinch roller surface engaging the print side of the paper stock causing the paper feed amount through the downstream nip roller set to be slightly greater than the paper feed amount through the upstream nip roller set thereby maintaining tension in the paper and avoiding irregular paper feed through the print zone.

SUMMARY OF THE INVENTION

In accordance with the invention therefore, there is provided a film drive apparatus for a photographic film scanner comprising an upstream nip roller including a drive roller having a compliant (compressible) film engagement surface and a pinch roller; a downstream nip roller set including a drive roller having a compliant (compressible) film engagement surface and a pinch roller. The apparatus also includes a drive motor; a drive mechanism directly engaging the drive motor to the downstream drive roller; and an elastic drive belt engaging the downstream drive roller to the upstream drive roller. The consequence of this arrangement is that the velocity ratio of the downstream to the upstream roller is greater than one thereby resulting in proper tensioning of the film across the film scanning aperture. Preferably, a stepper motor is used as the film drive motor thereby enhancing the uniformity of the velocity across the scanning aperture.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
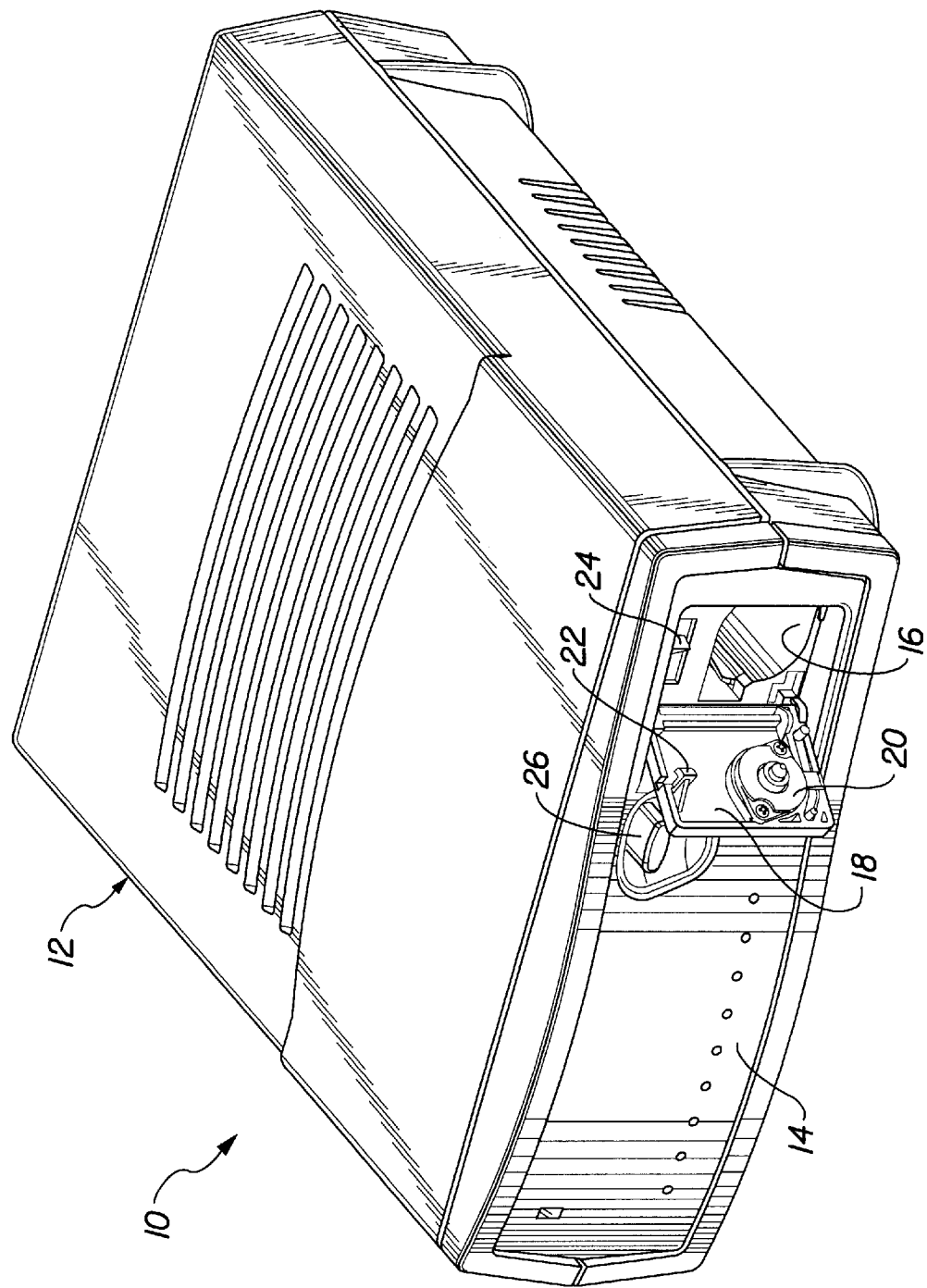
FIG. 1 is an isometric view showing a film scanner embodying the present invention.

In FIG. 1, there is shown a compact film scanner 10 adapted for use with APS film cartridges to convert film images to digital images. The illustrated scanner comprises an outer casing 12 and a front bezel 14 which enclose an internal film drive chassis to be described in more detail below. The chassis is provided with an APS film cartridge chamber 16 for receiving a manually inserted APS film cartridge. A hinged, spring-loaded door 18 includes a locating device 20 which acts to engage the end of the inserted film cartridge (not shown) as the door is closed to aid in properly positioning the film cartridge in the chamber 16. A latch hook 22 on the door engages an internal latching mechanism 24 to lock the door in the closed position. When it is desired to remove the film cartridge, a door release button 26 is actuated to unlock the latch mechanism allowing the door to spring open. An internal spring loaded mechanism (not shown) within the cartridge chamber forces the cartridge partially outward, allowing the user to grasp and remove the cartridge.

Figure 2:
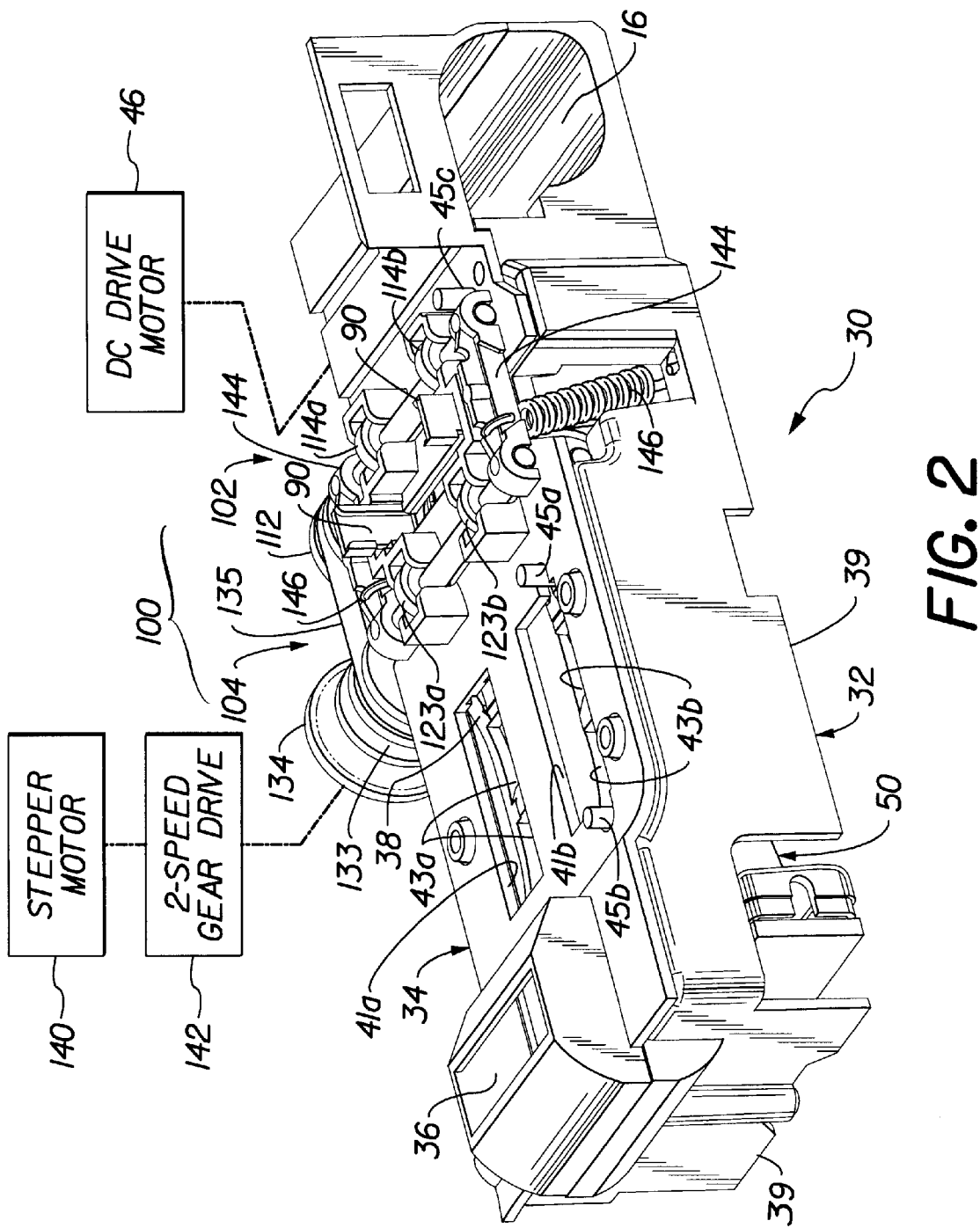
FIG. 2 is a perspective view of a film scanner chassis including film drive apparatus according to the present invention.
Figure 3:
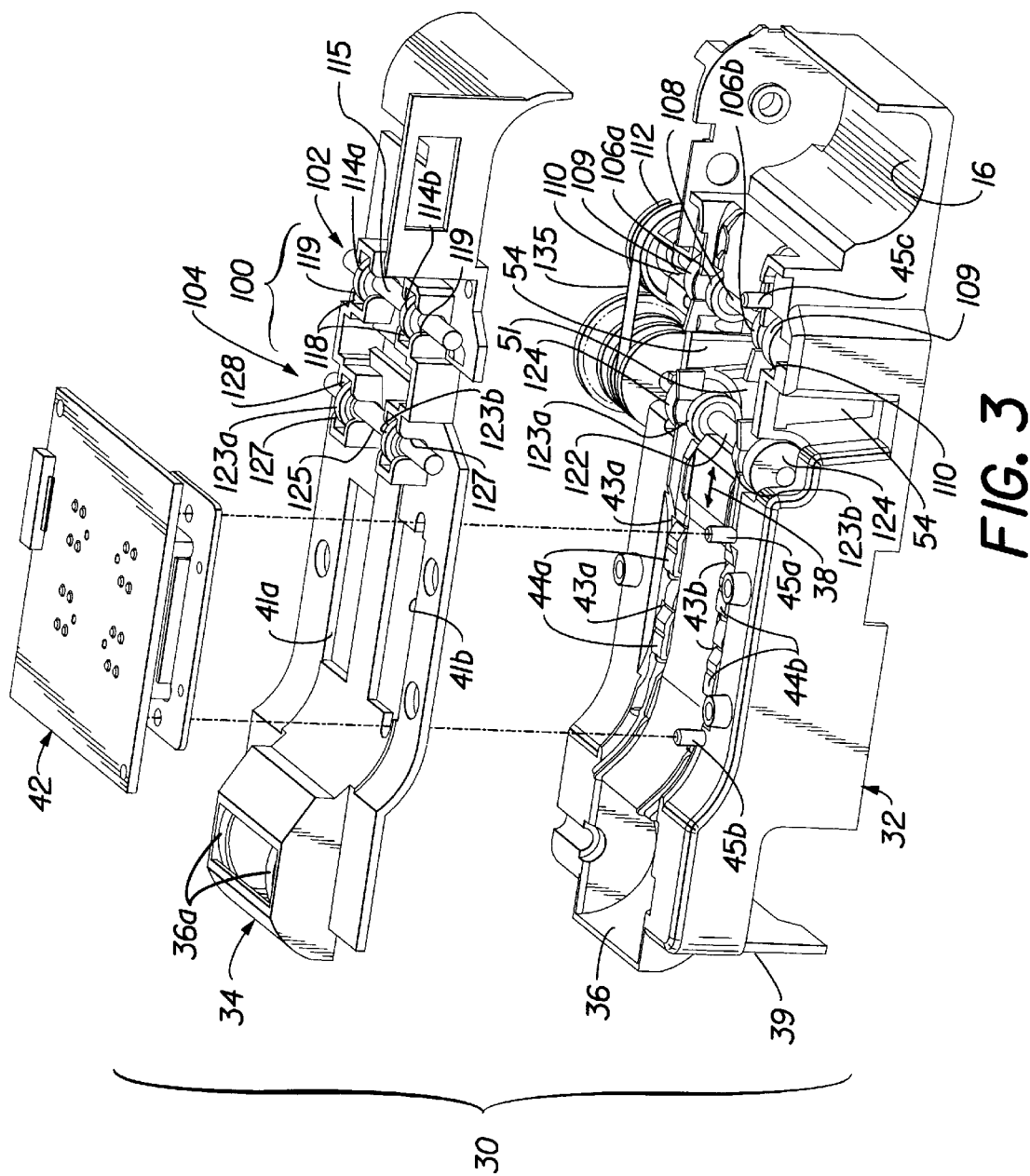
FIG. 3 is an exploded perspective view of the film chassis of FIG. 2 illustrating additional details of the film drive apparatus.
Figure 4A:
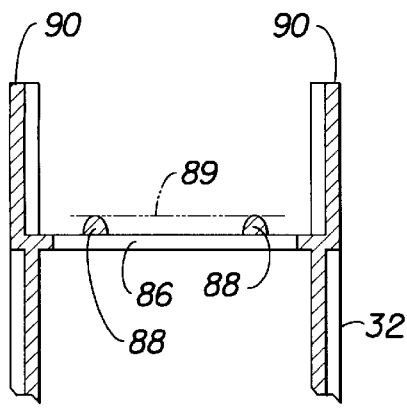
FIG. 4a is partial elevation end view in cross section of the scanning aperture end of the imaging apparatus shown in FIG. 4.
Figure 4:
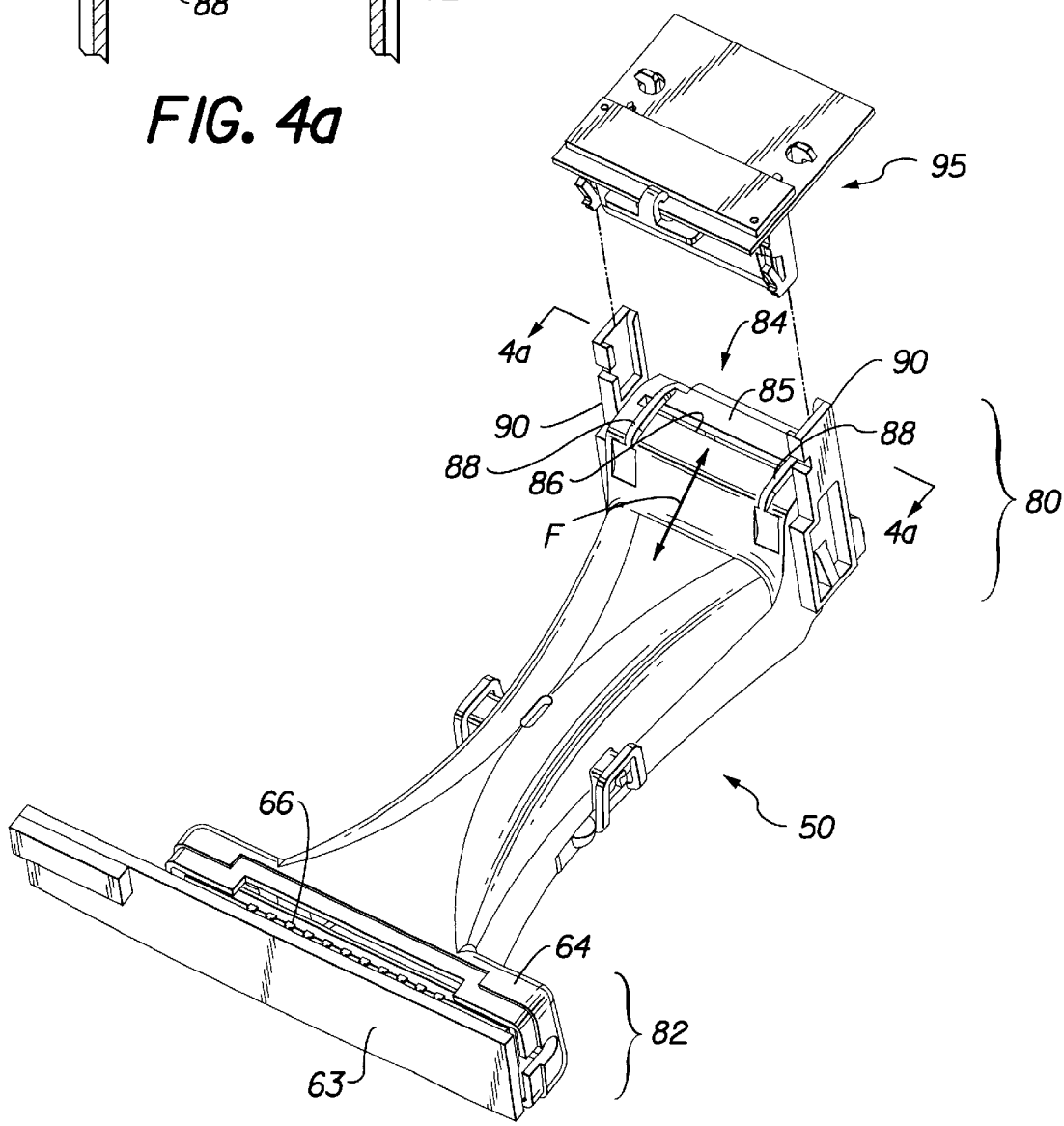
FIG. 4 is a partially exploded perspective view of an imaging apparatus and illumination head illustrating details of the film scan gate and scanning aperture.

Referring jointly to FIGS. 2 and 3, an internal film drive chassis 30 for the scanner 10 is shown and comprises a lower frame 32 and an upper plate 34 which, when assembled as shown, define the film cartridge chamber 16, a film takeup chamber 36 and a film path 38 longitudinally extending between the two chambers. The takeup chamber 36 comprises a known type of spool-less chamber in which film is pushed into the chamber and winds itself up in a tight coil in the chamber. Coil springs 36a in the chamber facilitate the coiling effect on the film as the diameter of the film coil expands with increasing amounts of film being pushed into the chamber. A film drive mechanism 100, of the present invention, includes upstream nip roller set 102 and downstream nip roller set 104, the upstream set being located nearest the film cartridge chamber 16. A pair of elongated apertures 41a, 41b are provided in upper plate 34 to allow access by magnetic read/write head assembly 42 (FIG. 3) to magnetic data tracks on the magnetic recording layer formed on the APS film thereby enabling data transfer to and from the film magnetic layer, in known manner, as part of the film scanning process. Recesses 43a and 43b are formed in the film path portion of the lower frame 32 to receive spring loaded pressure pads 44a and 44b, respectively (FIG. 3), in alignment with the magnetic read heads (not shown) in the read/write head assembly 42. Lower frame 32 is provided with depending skirt walls 39 that form a cavity in which is mounted imaging apparatus 50 (FIGS. 2 and 4). A triplet of upstanding, film edge guide pins 45a, 45b and 45c are disposed on the lower chassis frame 32 adjacent the recesses 43b and serve to guide film in the film path 38 in a manner that aligns recorded data tracks on the film with the read/write heads in the read/write head assembly 42, as will be described in more detail later. A reversible dc drive motor 46 engages the spool of the film cartridge (not shown) when the cartridge is inserted by the user into the film cartridge chamber 16. Motor 46 serves to thrust the film out of the cartridge to initiate a film scanning operation and to rewind the film into the cartridge at certain times during the scanning operation and at the conclusion of the scanning operation. Operating control of scanner 10 is obtained from a personal computer (not shown) to which the scanner is connected.

Figure 5:
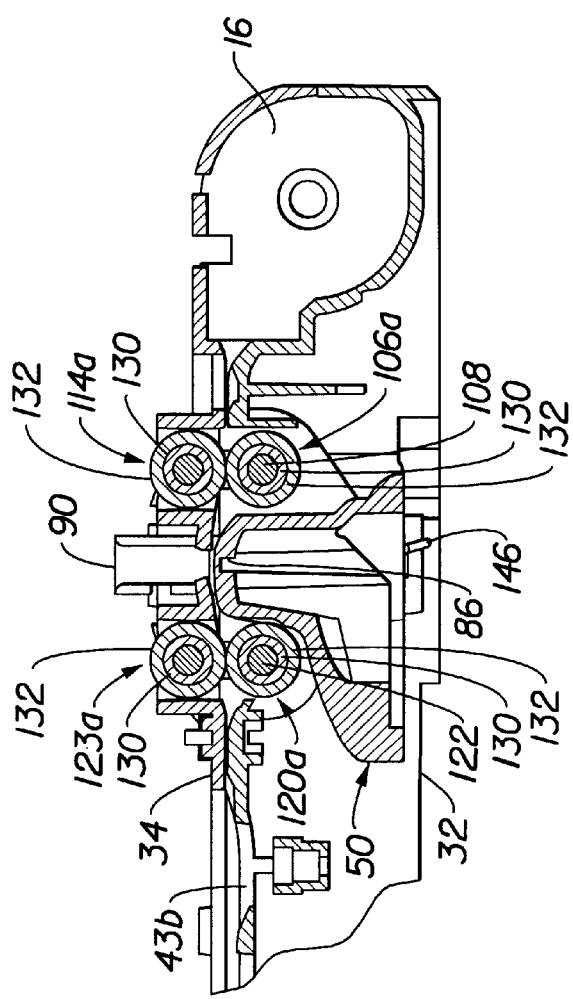
FIG. 5 is a partial side sectional view of the film drive nip roller sets and portions of the film scanner chassis and imaging assembly.

Imaging apparatus 50, seen in more detail in FIG. 4, comprises a film scanner end 80 which is snap mounted into an opening 51 formed in the lower chassis frame 32 and is held therein by depending clamp arms 54 formed at opposite ends of the opening 51. When inserted into the chassis, the film scanner end of the imaging assembly is straddled by film drive nip roller sets 102 and 104 of the present invention as better seen in FIGS. 5 and 6. The film scanner end 80 of imaging apparatus 50 includes a pair of upstanding support arms 90 integrally formed on the imaging apparatus 50. The arms 90 comprise support mounts for an illuminant head assembly 95. At the film scanning end 80, a scan gate portion 84 is provided with a curved, convex upward, surface 85 having an elongated light admitting aperture 86 extending laterally of the direction of film motion indicated by arrow F. The length of the aperture 86 is approximately coextensive with the full width of the film strip. A pair of spaced apart, curved film rails 88 span the aperture 86 and serve to support the film passing through the scan gate 84 in spaced relation to the surface 85 so as to minimize the possibility of damaging the film emulsion. The rails are spaced apart slightly more than the lateral dimension of the image frames so as to avoid scratching the emulsion in the area of the image frames. When properly tensioned by the film drive apparatus of the invention, the lateral direction of the film lies in a flat film plane 89 defined by the film rails 88 as seen in FIG. 4a. The other end 82 of the imaging apparatus 50 comprises a sub-housing 64 which encloses a linear CCD photosensor device 66 mounted on a printed wiring board 63. The elongated housing of imaging apparatus 50 comprises the sole means of support of the CCD 66 from the chassis frame 32.

Turning now jointly to FIGS. 2, 3, 5 and 6, the film drive apparatus of the present invention will be described in detail. Upstream nip roller set 102, located nearest the film cartridge chamber 16, includes a pair of drive rollers 106a and 106b pressed onto a drive shaft 108 which is journalled in ball bearings 109 which, in turn, are seated in bearing seats 110 formed in the chassis lower frame 32. A drive pulley 112 is press fit onto one end of shaft 108. A pair of pinch rollers 114a and 114b are placed onto a shaft 115 so as to freely rotate on the shaft. The pinch rollers are rotatably confined within opening walls 118 formed in chassis upper plate 34 so as to be in contact with drive rollers 106a and 106b, respectively. Shaft 108 is loosely nested within slots 119 formed in the walls 118. Downstream nip roller set 104 includes a pair of drive rollers 120a and 120b press fit onto drive shaft 122 which is journalled in ball bearings 124 which, in turn, are seated in bearing seats 126. A pair of pinch rollers 123a and 123b are placed onto a shaft 125 so as to be freely rotatable on the shaft. The pinch rollers are rotatably confined within opening walls 126 formed in chassis upper plate 34 so as to be in contact with drive rollers 120a and 120b when plate 34 is assembled with frame 32. Shaft 125 is loosely nested within slots 127 formed in the walls 128. In the illustrated embodiment, best seen in FIG. 5, pinch rollers 114a,b and 123a,b are similarly constructed with a hard plastic inner roller covered with an outer belt of elastic, compliant material. Pinch rollers 114a,b and 123a,b are held in compression against their respective drive rollers by means of pressure clamps 144 held in place by tension springs 146. The tensions springs 146 are biased as shown towards the downstream nip roller set 104 to exert a relatively stronger force on downstream pinch rollers 123a,b as compared to the force on upstream pinch rollers 114a,b. A belt drive pulley 133 and drive gear 134 are pressed onto the end of shaft 122. A reversible stepper motor 140 is directly coupled through a two speed drive gear mechanism 142 to the drive gear 130. An elastic drive belt 135, preferably made from an ethylene propylene material, is disposed in the pulleys 112 and 133 such that pulley 133 serves as the primary drive pulley and pulley 112 serves as the slave drive pulley.

Figure 6:
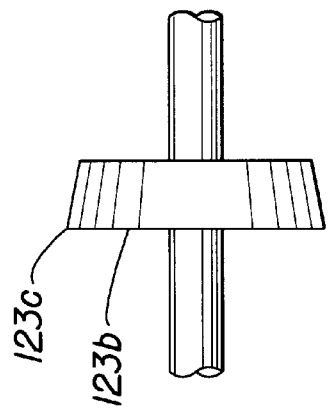
FIG. 6 is an elevation view of a conical pinch roller used in the film drive apparatus of FIG. 2.

Drive rollers 106a,b and 120a,b are cylindrical rollers of the same diameter and are each constructed of a hard inner roller material 130 covered by an outer belt of elastic, compliant material 132. Pinch rollers 114a,b and 123a are cylindrical rollers with a constant roller diameter throughout the width of the roller. Pinch roller 123b, however, is preferably a conical shaped roller, as shown in FIG. 6, with the larger diameter of the roller being to the outside of the film path, the roller outer surface being of a compliant material. As will be described in more detail below, the function of the conical pinch roller 123b is to provide a steering effect on film passing through the scan gate that holds the left edge of the film, as viewed from the cartridge chamber 16, against the guide pins 45a,b,c. In the illustrated embodiment, the pinch rollers are constructed similarly to the drive rollers in that the pinch rollers have a hard inner section 130 and the outer surface 132 is of compliant material.

In operation, when a film cartridge is inserted into the chamber 16 and the door 18 is closed, a scanning operation is initiated by actuating motor 46 to thrust film out of the cartridge toward the upstream nip roller set 102. At the same time, stepper motor 140 is actuated to cause the two speed gear drive 142 in the high speed mode to rotate drive rollers 106a,b and 120a,b in the counterclockwise direction, as viewed in FIG. 5, while pinch rollers 114a,b and 123a,b rotate in the clockwise direction. Once the thrust film reaches the upstream nip roller set 102, the nip roller set 102 controls the motion of the film. When the film has been withdrawn by a desired amount, the dc motor is deactivated to free wheel during the remainder of the scanner functions. Under the driving force of the nip roller set 102, the film continues its advance through the scan gate 84 to the downstream nip roller set 104. The film is then positioned for the next desired function, i.e. scanning or magnetic reading or writing. For image scanning, the gear drive mechanism 142 changes to slow speed operation to advance film across the scan gate at a reduced speed appropriate to the image scanning function. For reading or writing, the gear drive remains in the high speed mode. Once the desired image frames have been scanned, stepper motor 140 is reversed and gear drive is actuated in the high speed mode to transport the film back into the film cartridge. DC motor 46 is preferably also actuated in the reverse direction to aid in drawing the film into the cartridge particularly after the film has passed through upstream nip roller set 102 of the drive mechanism 100.

As previously mentioned, it is important during the scanning operation, while the film is advanced in the slow speed mode for line-by-line scanning of an image frame, that the film be maintained in a flat plane 89 in the line of scan over the scanning aperture 86. The use of a curved scan gate 84 with the curved surface 85 and curved film rails 86 aids in achieving this result. It is equally important to this result that, during the film motion, the film be maintained in relatively constant tension throughout the process of scanning the image frame. If the tension should vary, the film can momentarily buckle in the longitudinal direction (direction of film motion) causing loss of focus and uneven spacing of scan lines. Initially, it was considered that only a single nip roller set 104 downstream of the scan gate would be used to provide uniform driving force to the film as it advanced through the scan gate. It was found, however, that the APS film cartridge caused undesired variations in the tension on the film that adversely affected the flatness and longitudinal positioning of the film over the scan gate. The introduction of upstream nip roller set 102 served to provide a constant tensioning force on the film thereby buffering the film in the scan gate from the variable tensioning effects caused by the mechanics of the film cartridge. The addition of an upstream nip roller set introduces additional difficulties in maintaining the precise constant tensioning of the film required during image scanning. The solution employed in this invention is to employ compliant drive rollers at least in the downstream nip roller set and preferably in the upstream roller set, as well, coupled with an elastic drive belt between the primary (downstream) and slave (upstream) nip roller sets. The pressure on the downstream pinch rollers is made greater than that on the upstream pinch rollers such that the speed ratio of the downstream nip roller set is positive and is greater that the speed ratio of the upstream set. Speed ratio of a nip roller set is defined as the ratio of the speed of the web, film in this case, through a nip region relative to the surface speed of the drive roller outside of the nip region. The speed ratio with a compliant roller can be less than, equal to or greater than 1.0 dependent on a number of factors. These factors are: the normal (radial) force at the nip region, and, with respect to the elastomeric material on the drive roller: its thickness, modulus of elasticity and Poisson's ratio.

Figure 7:
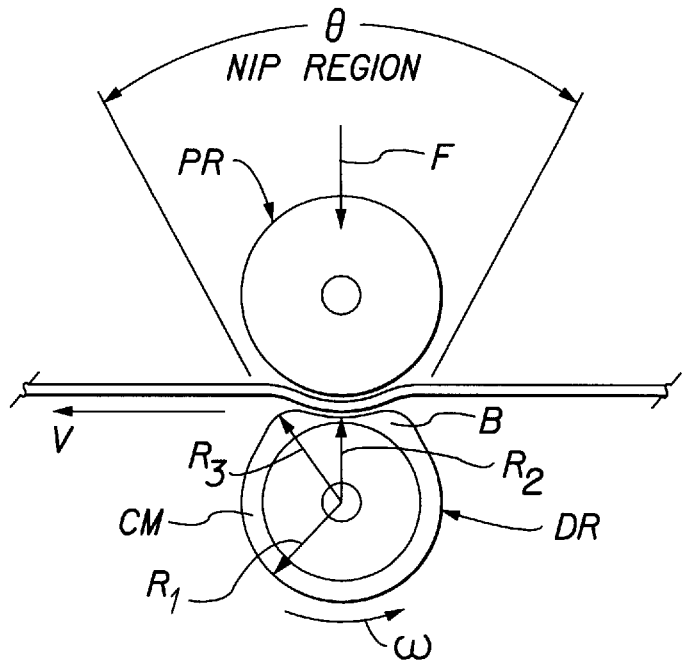
FIG. 7 is a graphical side view of a nip roller set used in explaining a feature of the invention.
Figure 8:
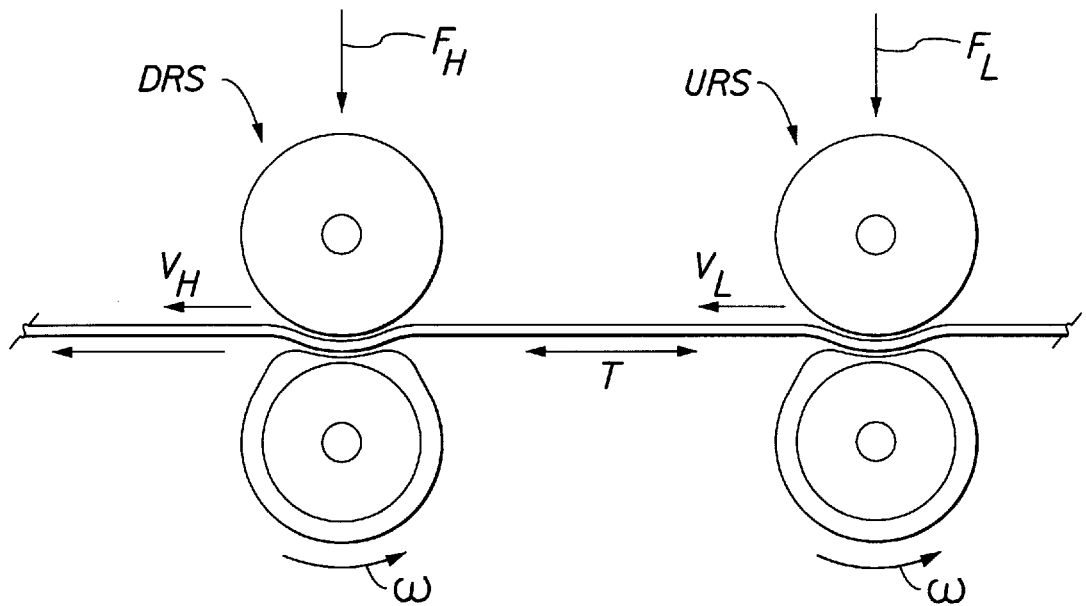
FIG. 8 is a graphical side view of a pair of nip roller sets used in explaining a feature of the invention.

The concept of speed ratio and its use in the present invention can best be described with reference to FIGS. 7 and 8. FIG. 7 is a graphical illustration of a nip roller set showing the effect of applying a force on a compliant drive roller DR. As a normal force F is applied to the drive roller via a pressure (idler) roller PR, a load is created on the outer compliant (elastomeric) material CM of the drive roller in the nip region between the pressure and drive rollers, as defined by angle θ, causing a reduction in the drive roller uncompressed radius $R_1$ to $R_2$. Depending on the material properties of the outer compliant material, the radial compression results in a lateral expansion B, or lateral strain, of the elastomeric material. The magnitude of the bulging depends on the modulus of elasticity and more importantly, on the Poisson's ratio of the compliant material. For instance, the higher Poisson's ratio, the higher the bulging effect becomes. Also, the thicker the elastomeric coating and the greater the normal (radial) force, the greater the bulging effect. The bulging effectively increases the radius of the drive roller to $R_3$. Significantly, outside the nip region, the radius of the drive roller remains at the nominal dimension $R_1$.

The surface speed in the nip region is determined by the interaction of the reduced radius $R_2$ and the increased radius $R_3$. The reduction of the radius $R_2$ results in the reduction of the surface speed determined by the angular velocity ω times the radius, $R_2$. The bulging material increases $R_3$ and effectively stretches the surface length of the drive roller through the nip region resulting in an increased surface speed coupled to the angular velocity time the radius $R_3$. If the elastomeric material's Poisson's ratio is small then the radius $R_3$ is not significantly larger than $R_1$ and the reduced radius $R_2$ outweighs the effect of increased radius $R_3$. The resultant surface speed is consequently slower within the nip region than it is outside the nip region. In this case, the speed ratio is less than 1.0. If the material's Poison's ratio is relatively high then the increase of radius $R_3$ outweighs the reduction of $R_2$, resulting in a surface speed in the nip region that is greater than outside the nip region. The speed ratio is therefore greater than 1.0. If the material's properties are such that the increase in $R_3$ just balances the reduce radius $R_2$, then the surface speed in the nip region is the same as outside the nip region and the speed ratio is exactly 1.0. Thus, by suitable adjustment of the applied force F, a desired speed ratio can be achieved. In accordance with a feature of the present invention, the speed ratio effect of consecutive nip roller sets can be effectively used to control tension between the two sets of nip rollers. Referring to FIG. 8, if the force $F_H$ at the downstream roller set is greater than the force $F_L$ applied at the upstream roller set, then the speed ratio through the downstream roller set, and the corresponding web velocity $V_H$ is greater than the speed ratio and web velocity $V_L$ of the upstream roller set URS and the result is a degree of tension in the web (film) between the two roller sets. Referring back to the embodiment of the invention illustrated in FIGS. 2 and 3, the differential forces applied to the upstream and downstream pinch rollers 114*a,b* and 120*a,b*, respectively, is achieved by offsetting the point at which tension springs 146 are connected to clamps 144. The drive rollers 106*a,b* and 120*a,b* are provided with an outer compliant sheathing, such as a polyurethane elastomer having an 85 Shore A durometer, mounted on an inner core that may be hard thermoset plastic or it may be a continuation of the compliant material. While this is a material employed in an actual embodiment of the invention, it will be appreciated by those skilled in the art that other compliant material with similar attributes may be used. For instance, silicone, neoprene, isoprene and propylene are examples of suitable alternative materials for this purpose. The outer circumference materials of the cylindrical pinch rollers 114*a,b* and 123*a* may be a compliant material similar to that of the drive rollers or they may be a non-compliant material, such as a hard plastic or metal. For reasons to be described subsequently, it is preferred that, as previously mentioned, pinch roller 123*b* have a conical (tapered) outer surface of compliant material similar to that of the drive rollers.

As described above, the film scanner 10 employs a spool-less film takeup chamber 36. This is a selection dictated by considerations of design simplicity and lower cost over takeup chambers employing spools and/or active film takeup drive mechanisms. A difficulty with spoolless takeup chambers, however, is that the resistive force exerted on the film strip increases as the diameter of the film wound inside the chamber grows. This increasing resistive force is reflected back to the outlet side of the downstream nip roller set 104. This has the effect of reducing the speed ratio of the downstream nip roller set causing the film speed through the downstream nip roller set to decrease which, in turns reduces the speed differential between the downstream and upstream nip roller sets. Normally, this would adversely affect the tension in the film between the nip roller sets; however, the use of an elastic drive belt 135 results in an automatic adjustment of tension in the tension side of the belt (the upper side in the drawing) that compensates for the effect on speed ratio of the downstream nip roller set caused by the increasing resistive force on the film. As the downstream speed ratio tends to reduce, the tension in the tension side of the belt reduces, causing a proportional reduction in the speed of the upstream nip roller set thereby tending to increase the speed differential. The effect of this feedback through the elastic drive belt results in restoration of the desired speed differential between the downstream and upstream nip roller sets and the corresponding film tension between the nip roller sets.

Figure 9:
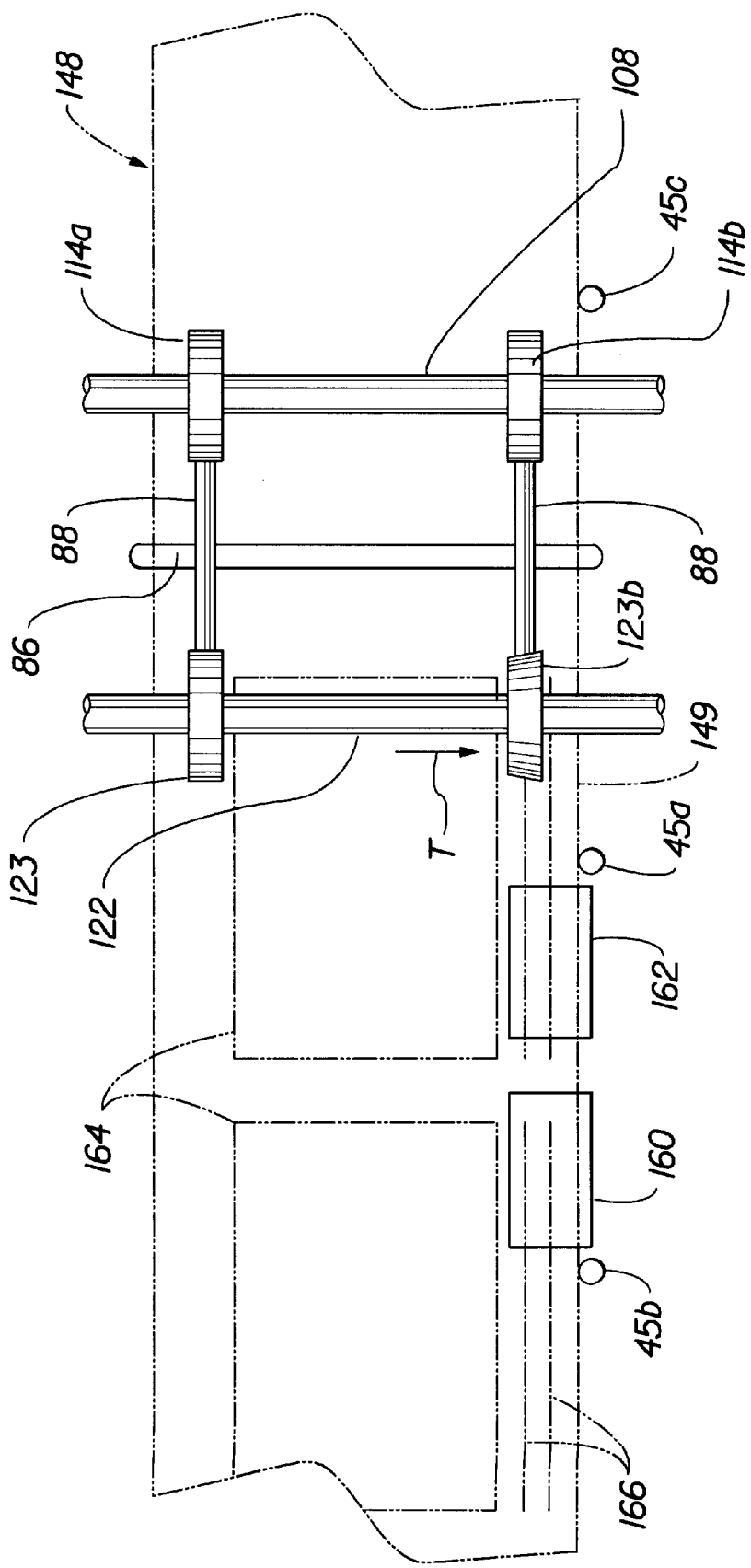
FIG. 9 is a plan view of portions of the nip roller set and their relation to film edge guide features of the film scanning apparatus.

Referring to FIG. 9, the effect of using a compliant conical-shaped pinch roller 123*b* can be seen. As film 148 is advanced through the scan gate over the scan aperture 86, the conical pinch roller 123*b* exerts a moment on the film 148 that results in urging the left edge 149 of the film toward the edge guide pins 45*a,b,c* as shown by arrow T. The purpose of this is to enhance the correct alignment of the read/write heads 160, 162 in the magnetic head assembly 42 with data tracks 166 on the film adjacent image frames 164. It will be appreciated that data tracks and corresponding read/write heads also exist at the opposite edge of the film but are omitted in the drawing for simplicity purposes. It has been found through modeling and testing that a single conical roller is preferred over also making roller 123*a* conical. With both downstream rollers being conical in shape, excess turning force would be encountered which would adversely affect the flatness of the film in the scan gate region between the nip roller sets. While the use of a single conical shaped pinch roller 123*b* is a presently preferred embodiment, an alternative embodiment to achieve the same result would be to employ all cylindrical rollers and to make the left side drive rollers 106*b* and 120*b* larger in diameter than the right side rollers 106*a* and 120*a*. This effects a higher film velocity through the left side nip rollers sets than in the right side nip roller sets which creates a moment that urges the film toward the edge guide pins 45*a,b,c* in a manner similar to that described above.

The invention has been described in detail with particular reference to certain preferred embodiments thereof, but it will be understood that variations and modifications can be effected within the spirit and scope of the invention.

PARTS LIST

| PARTS LIST | |
|---|---|
| 10 | film scanner |
| 12 | outer casing |
| 14 | front bezel |
| 16 | film cartridge chamber |
| 18 | chamber door |
| 20 | locating device |
| 22 | latch hook |
| 24 | latching mechanism |
| 30 | film drive chassis |
| 32 | lower frame |
| 34 | upper plate |
| 36 | film takeup chamber |
| 38 | film path |
| 39 | lower frame skirt wall |
| 41 a,b | read/write head apertures |
| 42 | read/write head assembly |
| 43a,b | recesses |
| 44a,b | pressure pads |
| 45a,b,c | film edge guide pins |
| 46 | dc drive motor |
| 50 | imaging apparatus |
| 51 | chassis opening |
| 63 | CCD printed wiring board |
| 64 | image sensor sub-housing |
| 66 | CCD photosensor |
| 80 | film scanner end |
| 82 | light sensor end |
| 84 | scan gate |
| 85 | scan gate surface |
| 86 | light admitting aperture |
| 88 | film rails |
| 89 | film plane |
| 90 | support arms |
| 95 | illuminant head assembly |
| 100 | film drive mechanism |
| 102 | upstream nip roller set |
| 104 | downstream nip roller set |
| 106a,b | upstream drive rollers |
| 108 | driveshaft |
| 109 | ball bearings |
| 110 | bearing seats |
| 112 | drive pulley |
| 114a,b | pinch rollers |
| 115 | pinch roller shaft |
| 118 | pinch roller opening walls |
| 119 | shaft slots |
| 120a,b | downstream drive rollers |
| 122 | driveshaft |
| 123a,b | pinch rollers |
| 124 | ball bearings |
| 125 | pinch roller shaft |
| 127 | shaft slots |
| 128 | pinch roller opening walls |

-continued

PARTS LIST

| | | |
|---|---|---|
| 130 | | inner roller material |
| 132 | | drive roller compliant outer belts |
| 133 | | primary drive pulley |
| 134 | | drivegear |
| 135 | | elastic drive belt |
| 140 | | reversible stepper motor |
| 142 | | two speed gear drive mechanism |
| 144 | | pressure clamps |
| 146 | | tension springs |
| 148 | | film |
| 160, 162 | | read/write heads |
| 164 | | film image frames |
| 166 | | film data tracks |

What is claimed is:

1. Film drive apparatus comprising:

an upstream nip roller set including at least one drive roller and pinch roller set in which the drive roller has a compliant film engagement surface;

a downstream nip roller set including at least one drive roller and pinch roller set in which the drive roller has a compliant film engagement surface;

a drive motor directly engaged with the downstream drive roller set;

an elastic drive belt drivingly engaging the downstream drive roller set to the upstream drive roller set; and means for exerting a differential compression force on said pinch rollers against their respective drive rollers, the compression force on the downstream nip roller set being higher than on the upstream nip roller set;

whereby a self-regulating speed differential of the downstream nip roller set to the upstream nip roller set is maintained greater than one.

2. Film scanning apparatus of the type having a film cartridge chamber for receiving a film cartridge containing photographic film having images to be scanned, a film takeup chamber and a film scan gate therebetween; the apparatus comprising:

an upstream nip roller set including at least one drive roller and pinch roller set in which the drive roller has a compliant film engagement surface and is positioned between the film cartridge chamber and the film scan gate;

a downstream nip roller set including at least one drive roller and pinch roller set in which the drive roller has a compliant film engagement surface and is positioned between the film scan gate and the film takeup chamber;

whereby said upstream nip roller set exerts constant tensioning force on film in the film scan gate buffering the film in the film scan gate against variable tensioning effects on the film caused by the film cartridge.

3. The film scanning apparatus of claim 2 wherein said film takeup chamber exerts an increasing resistive force on said film exiting said downstream nip roller set with increasing diameters of film wound into said takeup chamber, said apparatus including an elastic drive belt drivingly engaging said downstream nip roller set to the upstream nip roller set, whereby said elastic belt compensates for reductions in speed differential of said downstream nip roller set to said upstream nip roller set caused by said increasing resistive force on said film exiting said downstream nip roller set.

4. The film scanning apparatus of claim 2 wherein said apparatus includes a plurality of edge guide pins adjacent said film scan gate; and said downstream nip roller set includes a conical shaped pinch roller having a compliant film engaging surface; said conical pinch roller effectively urging an adjacent edge of said film against said edge guide pins.

5. The film scanning apparatus of claim 4 wherein said apparatus includes magnetic read and/or write heads located at a predetermined relative position to said film edge guide pins and said conical pinch roller urging said film against said edge pins to maintain data tracks on said film in alignment with said magnetic read and/or write heads.

6. The film scanning apparatus of claim 2 wherein said apparatus includes a plurality of edge guide pins adjacent said film scan gate; and said upstream and downstream nip roller sets each include a pair of drive roller and pinch rollers adjacent opposite edges of film transported through said scan gate; the drive rollers nearest said edge guide pins having a larger diameter than drive rollers remote from said edge guide pins; whereby said film is urged against said edge guide pins during transport of film through said film scan gate.

7. The film scanning apparatus of claim 2 wherein said apparatus includes a drive motor directly engaged with the downstream drive roller set;

an elastic drive belt drivingly engaging the downstream drive roller set to the upstream drive roller set; and means for exerting a differential compression force on said pinch rollers against their respective drive rollers, the compression force on the downstream nip roller set being higher than on the upstream nip roller set.

8. The film scanning apparatus of claim 7 wherein said upstream and downstream nip roller sets include shafts on which said pinch rollers are placed in freely rotatable manner; said means for differential compression force comprises a pair of compression clamps engaging said pinch roller shafts and a pair of tension springs engaging said compression clamps offset closer to said downstream pinch rollers than said upstream pinch rollers to apply a relatively higher compression force on said downstream pinch rollers than said upstream pinch rollers.

* * * * *